July 24, 1934.          F. E. WOLCOTT          1,967,982
COFFEE MAKER
Filed April 23, 1931
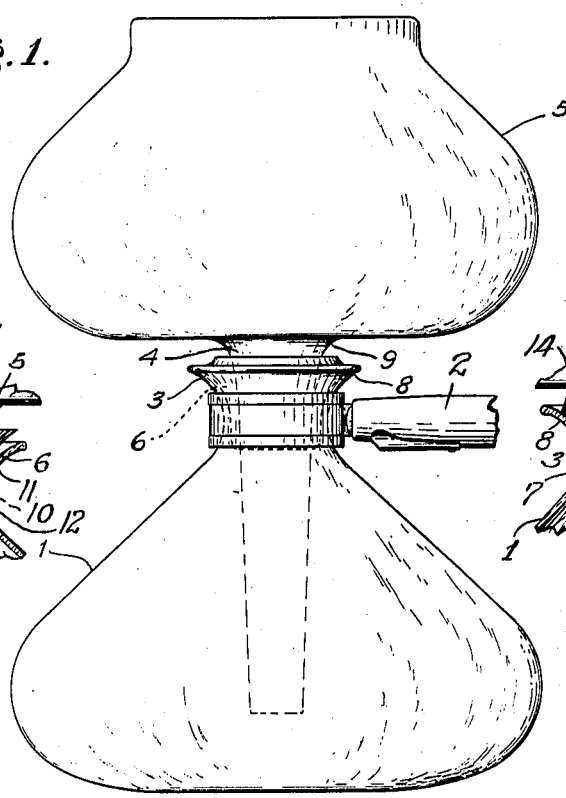
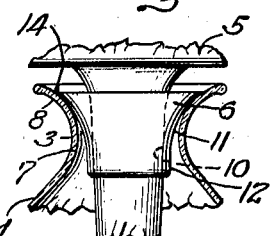
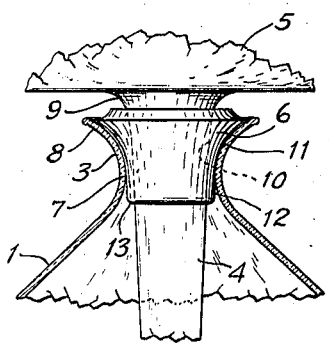
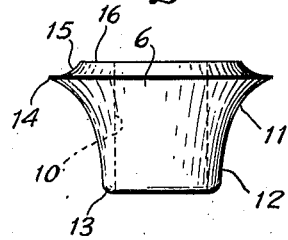
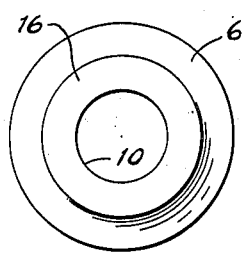
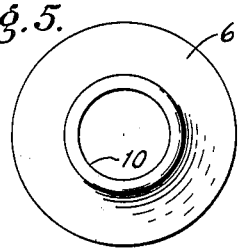
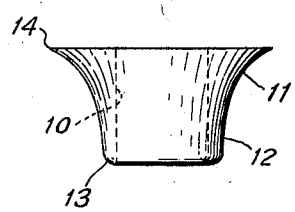
INVENTOR
FRANK E. WOLCOTT
BY
ATTORNEY.

Patented July 24, 1934

1,967,982

UNITED STATES PATENT OFFICE 1,967,982

COFFEE MAKER

Frank E. Wolcott, West Hartford, Conn., assignor to The Silex Company, a corporation of Connecticut Application April 23, 1931, Serial No. 532,248

6 Claims. (Cl. 53—3)

My invention relates to coffee makers.

My invention has among its objects to provide an improved coffee maker having an improved seal carried by the upper bowl and co-operating in a new manner with the upper and lower bowls. A further object of my invention is to provide such a coffee maker having a seal which is markedly more readily and certainly insertable by the average user in a proper manner and which is also much more readily removable. Still further objects are to provide an improved seal whereby both sealing from the top and over a new and substantially greater depth is obtained, at the same time that any objectionable rocking or tilting of the upper bowl is prevented and a construction is produced which is also adapted to use with stems and necks of relatively widely varying diameters in such manner as to facilitate assembly and reduce the cost of manufacture.

In the accompanying drawing I have shown for purposes of illustration two embodiments which my invention may assume in practice.

In the drawing,—

Figure 1 is a side elevation of a coffee maker equipped with my improved seal, the handle being broken away to facilitate illustration;

Fig. 2 is a detail view showing the stem and seal in elevation and the neck of the lower bowl in section to facilitate illustration;

Fig. 3 is an enlarged side elevation of the seal removed from the stem of the upper bowl;

Fig. 4 is a top plan view of the seal shown in Fig. 3;

Fig. 5 is a bottom plan view of the same;

Fig. 6 is a side elevation corresponding to Fig. 3, but showing a modified form of seal;

Fig. 7 is a detail view similar to Figure 2, showing the modified seal of Figure 6 in position in a smaller neck, and Fig. 8 is a like view showing the same in a larger neck.

In the illustrative construction shown in Figures 1 to 5, it will be noted that in Figures 1 and 2 I have shown a coffee maker comprising a lower bowl 1 carrying a handle 2 on its neck 3, and having the stem 4 of its upper bowl 5 extended through a seal 6 seated in the neck 3, this seal being improved as hereinafter described.

Referring more particularly to the construction shown in Figure 2, it will be noted that the neck 3 of the lower bowl 1 is provided with a curved constriction 7 and above the same with an outwardly curved or flared mouth portion 8, while the stem 4 of the upper bowl 5 is as usual slightly tapered toward its lower end and joined to the body of the bowl 5 by an outwardly curved enlarged portion 9. Upon this stem 4 my improved seal is carried in a usual manner below the curved portion 9.

Considering the seal 6 more in detail, it will be noted that the same is formed of very soft rubber of highly resilient character, preferably of a quite pure red rubber. It will also be noted that the member 6 is provided with an axial aperture 10, herein as preferably of uniform diameter, although it may be slightly tapered if desired, and which is adapted to receive and snugly grip the stem 4 of the upper bowl in a usual manner. Herein, however, it will be noted that the sealing area is at the top of the member 6 and is the part of the same which is disposed at or above the point of maximum constriction 7 in the neck. Further, this sealing portion is curved as shown at 11, and of such gradually diminishing diameter from top to bottom as to conform substantially to the neck and fill the same. Moreover, it will be noted that the part of the member 6 below the point 7 is reduced slightly as shown at 12 to form a continuation of 11, and provided with a rounded lower edge 13, which edge not only has no sealing function but, being out of contact with the glass of the neck 3, cannot impede either the insertion or removal of the seal. Herein it will also be observed that the upper end of the sealing area merges into a laterally projecting sealing flange 14, herein as preferably flexible and having a thin annular rim adapted to increase its wearing quality. As shown, this flange 14 is also connected by a reversely disposed and inwardly and upwardly extending curved portion 15 with an upwardly projecting top portion or axial flange 16 of smaller diameter than the flange 14 and herein of slightly greater diameter and thickness than the lower end 12. In Figure 6 I have also illustrated a modified construction which, while not preferred, may be used if desired. In this construction it will be observed that the portions 11, 12 and 13 are the same as heretofore described, but that the portions 15 and 16 have been omitted and that the flange 14 is more thin and has its top in the plane of the top of the seal.

When, as shown in Fig. 2, my improved seal 6 is carried upon the stem 4, in the position heretofore described, and the stem is then placed in the neck 3 of a lower bowl having a neck size of exactly correct diameter, it will be noted that the sealing area of the member 6 will extend from the top down approximately opposite the point of greatest constriction 7 in the neck. More particularly, the portion 11 will snugly fit and fill the bowl neck 3 for a substantial depth and the sealing flange 14 will seal the top. Moreover, it will be noted that this improved seal is thus adapted to function effectively without requiring heavy downward pressure, the new deep and effective seal which seals as it seats and having no sealing enlargement at its bottom, making such pressure unnecessary. In fact, in practice it is possible to obtain an effective seal by simply lowering the parts into place, the weight of the upper bowl and its equipment being sufficient to cause proper sealing. The seal, not having required jamming to make it seal, is also obviously readily broken by simply lifting out the upper bowl. Attention is further directed to the fact that due to the shape of the portion 11 and the flange 14, the upper bowl stem is definitely located in a central position and restrained from tilting, while this flange and the upper flange 16 further act effectually to prevent any contact between the glass of the two bowls.

Attention is further directed to the fact that due to the improved shape of the seal and the use of soft rubber enabling the same to conform readily while fitting snugly, it is made possible for my improved seal to be used effectively despite the variations in the inner diameter of the neck and the outside diameter of the stem which occur in manufacture of the bowls. In Figures 7 and 8, I have illustrated a seal of the construction shown in Figure 6 in bowl necks of different diameter at the point of minimum diameter thereof, as examples of the extremes of use of my improved seals with bowls of different neck size ordinarily encountered in practice due to the variations inherent in the manufacture of such bowls of glass. In Figure 7, it will be noted that although the portion 7 of the neck engages the seal at a point substantially below that shown in Figure 2, an effective annular sealing band is still provided although narrower than the sealing band illustrated in Figure 2, while in Figure 8, it will be evident that although the portion 7 has no engagement with the seal member, an effective seal is provided in the bell-mouthed portion of the neck in the form of an annular sealing band likewise narrower than that illustrated in Figure 2. Thus, it will be evident that since my improved seal may be used under these conditions and with numerous intermediate neck diameters, it makes it possible to utilize bowls having a wide variation in neck diameter. Further, of course, it will be evident that the form of seal shown in Figure 3 will provide similar results.

By reason of my improved construction including the new top sealing area 11 and the bottom reduced portion 12, it will be noted that I avoid the need for the heavy pressure which is inherent where the lower end of the seal does the actual sealing, and accordingly, has to be of larger diameter than the neck and be forced down by pressure. Further, it will be observed that at the same time that this pressure is made unnecessary in bringing the parts together, the parts are more readily separated in my improved construction, the elimination of the binding at the lower end permitting the same to be lifted out easily and without necessity for holding on to the lower bowl and without causing burning, apt to result from hasty grasping of the same to prevent the elevation of the lower bowl when the same tends to stick and rise with the upper bowl, as frequently occurs in the old constructions. It will of course also be evident that, although ordinarily unnecessary, if it is desired for any reason to tighten the fit, this may be accomplished in my improved construction by but a light rotation of the upper bowl relative to the lower bowl, while the seal may be broken by a similar rotative movement. These and other advantages of my improved construction will, however, be clearly apparent to those skilled in the art.

This application is a continuation in part of my application Serial No. 498,056, filed November 25th, 1930.

While I have in this application specifically described two forms which my invention may assume in practice, it will be understood that these forms of the same are used for purposes of illustration, and that the invention may be modified and embodied in other forms without departing from its spirit or the scope of the appended claims.

What I claim as new and desire to secure by Letters Patent is:—

1. In a coffee maker, the combination with a lower bowl having an upstanding tubular neck, the passage through which has a portion of minimum diameter, and an upper bowl having a stem depending through said neck and into said lower bowl, of a fluid sealing member on said upper bowl seated within said neck having an upper tapered supporting portion and a lower less abruptly tapered sealing portion each comprising a plurality of external annular sealing surfaces of diminishing diameter in the direction of the lower end of said body disposable at different heights in necks of different diameter, one of which surfaces engages said neck passage in a continuous annular sealing band at or above its portion of minimum diameter irrespective of variations in neck diameter.

2. In a coffee maker, the combination with a lower bowl having an upstanding tubular neck, the passage in which has a portion of minimum diameter and terminates in an upper flared lip, and an upper bowl having a stem adapted to extend through said neck into said lower bowl, of a fluid sealing member comprising a resilient body disposed about said stem and seated in the neck of said lower bowl having a minimum diameter at the body bottom and having a laterally extended flange of substantial extent relative to said body bottom adjacent the upper end thereof providing an external abruptly tapered supporting portion of diminishing diameter toward said body bottom, and a part beneath said flange having a side wall presenting a series of vertically arranged annular sealing portions of diminishing diameter toward the bottom thereof, said upper and lower portions providing a relatively narrow annular sealing band between said body and neck located at different vertical positions on said body when the latter is received in different vertical positions in said neck as a result of variation in neck diameter.

3. In a coffee maker having upper and lower bowls, the former having a depending stem and the latter an upstanding neck, the passage in which is curved to provide an upper bell-mouthed orifice and has a communicating throat portion of minimum diameter, a resilient body disposed in the neck of said lower bowl, having a minimum diameter at the body bottom and an axial bore therethrough having a portion of substantially uniform diameter disposable in said throat portion and receiving the stem of said upper bowl, said body also having a flange of substantial extent relative to said minimum diameter projecting laterally from said body adjacent the top thereof above the bell-mouthed walls of said neck passage, and a part of said body beneath said flange also having side walls presenting a series of sealing portions of diminishing diameter co-operating to provide an annular sealing band between said body and neck in different vertical positions at or above the throat portion of said neck when said body is received in different vertical positions in the neck of said lower bowl.

4. In a coffee maker having upper and lower bowls, the former having a depending stem and the latter an upstanding neck having a passage forming an upper bell mouth and also having a lower throat portion of minimum diameter, a resilient body disposed in the neck of said lower bowl, having a minimum diameter at the body bottom and an axial bore therethrough having a portion of substantially uniform diameter disposable in said throat portion and receiving and sealing said stem, said body also having a flange of substantial width relative to said minimum diameter projecting laterally from said body adjacent the top thereof and disposable in said bell mouth, an upper body portion beneath said flange having side walls presenting a series of sealing portions of diminishing diameter providing an annular sealing band beneath said flange at different heights along said body and between said neck and body at or above said throat depending upon variations in the diameter of the latter, and a lower body portion beneath said upper body portion and having co-operating band forming sealing means engageable with said throat when the latter is of still smaller diameter, said lower portion having no circumferential dimension greater than the least dimension of said upper portion.

5. In a coffee maker having upper and lower bowls, the former having a depending stem and the latter an upstanding neck curved to provide an upper bell-mouthed orifice and having a lower throat portion of minimum diameter, a resilient body disposed in the neck of said lower bowl, having a minimum diameter at the body bottom and an axial bore therethrough having a portion of substantially uniform diameter disposable in said throat portion and receiving and sealing said stem, said body having a sealing flange portion of substantial width relative to said minimum diameter of said body projecting laterally from said body adjacent the top thereof and above the bell-mouthed walls of said neck, said portion having immediately beneath its flange curved side walls substantially conforming to the curve of a portion of said bell-mouthed orifice and sloping inwardly and downwardly from the periphery thereof providing an annular sealing band between said sealing flange portion and said neck above said throat portion when the minimum neck diameter is substantially larger than the minimum diameter of said body portion, said flange portion being flexible and having a flexible peripheral portion adapted to seal the peripheral portion of said mouth while positioning said upper bowl against tilting.

6. In a coffee maker having upper and lower bowls, the former having a depending stem and the latter an upstanding neck curved to provide an upper bell-mouthed orifice and having a lower throat portion of minimum diameter, a resilient body disposed in the neck of said lower bowl, having a minimum diameter at the body bottom and an axial bore therethrough having a portion of substantially uniform diameter disposable in said throat portion and receiving and sealing said stem, said body having a sealing flange portion of substantial width relative to said minimum diameter of said body projecting laterally from said body adjacent the top thereof and above the bell-mouthed walls of said neck, said portion having immediately beneath its flange curved side walls substantially conforming to the curve of a portion of said bell-mouthed orifice and sloping inwardly and downwardly from the periphery thereof providing an annular sealing band between said sealing flange portion and said neck above said throat portion when the minimum neck diameter is substantially larger than the minimum diameter of said body portion, said flange portion being flexible and having a flexible peripheral portion adapted to seal the peripheral portion of said mouth while positioning said upper bowl against tilting, and a lower body portion beneath said curved portion and integral therewith, said lower portion having no circumferential dimension greater than the least dimension of said curved portion and presenting a series of co-operating band forming sealing means engageable with said throat portion in different vertical positions depending upon the diameter of said throat portion.

FRANK E. WOLCOTT.